May 14, 1940.    N. POLIKOFF ET AL    2,200,779
FISHING REEL
Filed June 17, 1938
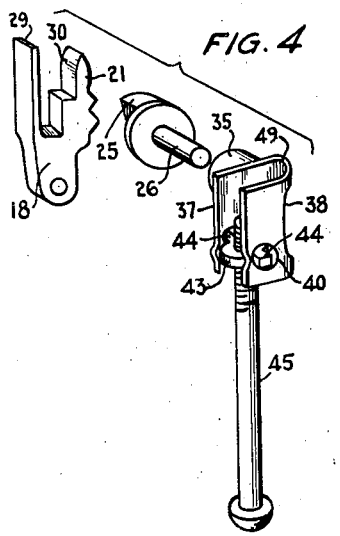
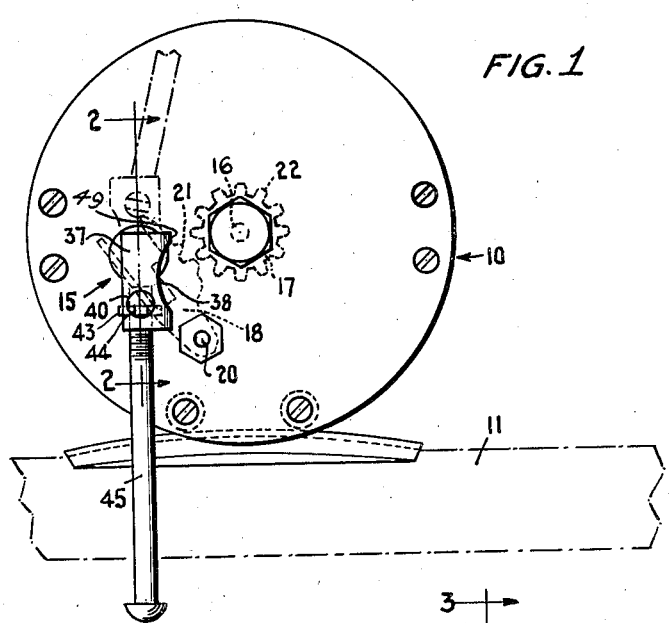
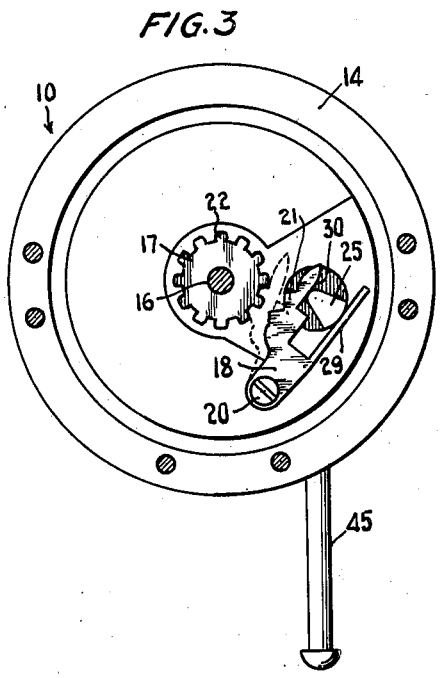
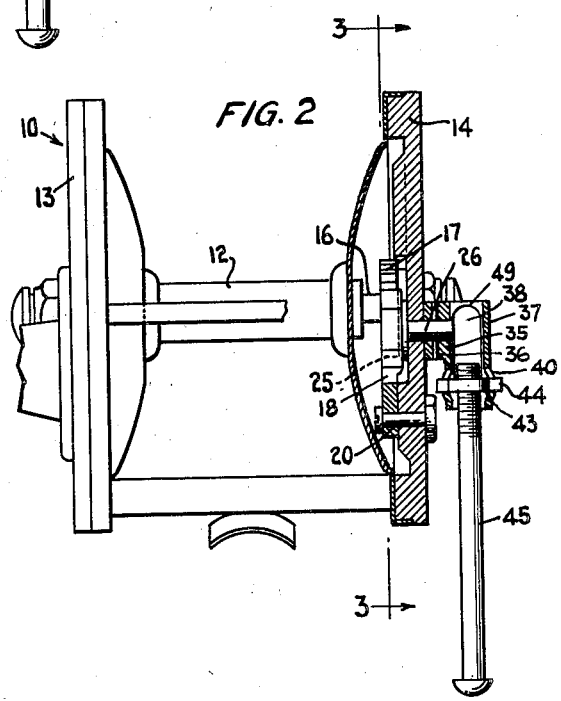
NATHAN POLIKOFF
WILLIAM GUNNER
INVENTORS
BY Victor J. Evans & Co.
ATTORNEYS

UNITED STATES PATENT OFFICE 2,200,779

FISHING REEL

Nathan Polikoff and William Gunner, Brooklyn, N. Y.

Application June 17, 1938, Serial No. 214,336

4 Claims. (Cl. 242—84.5)

This invention relates to improvements in fishing reels and especially to a new and improved fishing reel suited for casting.

In certain types of fishing, especially in casting and the like, the fisherman places the pole over his shoulder and snapping it quickly forwardly, throws the line and sinker from a position behind him in a direction in front of him. Inasmuch as it is desired that the line and sinker move as far as possible in a direction in front of the fisherman, it has been customary for the fisherman to hold the line while casting and to release the line when the rod has been moved to the limit of its forward motion. In this manner, the line does not unreel while the sinker and line end are behind the fisherman but is free to unreel when they are in front. It requires considerable experience and skill to properly hold the line during casting in order to prevent loss of useful force from the casting whereby the line and sinker are not cast as far as they might be.

Various expedients have been employed from time to time in attempts to provide braking means for mechanically performing the holding of the line. None of these devices has proved satisfactory in use however, inasmuch as all require substantially the same degree of skill as is required for holding the line and merely substitute mechanical means for holding the reel. That is to say, in using these devices, it is necessary for the fisherman to brake and release the reel, and to select the proper times for doing so, just as heretofore has been necessary for him to hold and release the line.

It is among the more important objects of the present invention to provide novel means, cooperating with fishing reels, for inhibiting rotation of the reel during the casting operation but substantially automatically releasing the reel and permitting rotation thereof at other times.

Another important object of the present invention is to provide a fishing reel control mechanism, operable by casting motion of the fishing rod upon which the reel is carried whereby the reel is released and free to rotate for certain positions of the fishing rod but is restricted in rotative motion when the rod is in other positions.

An important advantage of the novel fishing reel control mechanism, as herein described, is that it obviates the necessity of experience, skill or judgment in the holding of the line during casting and thereby permits even inexperienced beginners to achieve results comparable to those attained by experienced fishermen.

An important feature of the novel fishing reel construction according to the present invention is its simplicity and ruggedness whereby the initial cost of manufacture is minimized and likelihood of damage to mechanism during ordinary use is lessened.

Another feature of the present novel reel control means is that it comprises relatively few moving parts and accordingly there is little likelihood of wear or damage during use.

A further advantage is that the simplicity of construction of the elements of the mechanism suit it to the requirements of mass production.

Other objects, advantages and features of the novel fishing reel controlling mechanism will be apparent to those skilled in the art during the course of the following description.

Regarded in certain of its broader aspects, the present invention comprises a pendulum actuated reel brake adapted to restrict rotative motion of the reel during casting operation until the rod has reached the limit of its forward motion.

In order to facilitate a fuller and more complete understanding of the matter of the present invention, a specific embodiment thereof will be hereinafter described, being clearly understood however, that the illustrated embodiment is given solely by way of example and is non-limitative upon the scope of the present invention, except as explained in the subjoined claims.

Referring then to the drawing,

Fig. 1 is substantially a side elevational view of the now preferred embodiment of the present invention, showing the same associated with a conventional type of fishing reel mounted on a fishing rod (portions of the last mentioned being omitted for clearness).

Fig. 2 is substantially a vertical sectional view of Fig. 1 taken along the line 2—2.

Fig. 3 is substantially a vertical sectional view of Fig. 2 taken along the line 3—3, and Fig. 4 is essentially an exploded perspective view of the fishing reel brake mechanism according to the instant invention illustrating the relationship of certain parts thereof.

A fishing reel, generally designated by the numeral 10, mounted on a fishing rod 11 and having a rotatable spool 12 journalled in the sides 13 and 14 thereof, is provided with control mechanism, generally designated by the numeral 15. The spool 12 is mounted on a shaft 16 having a pinion gear 17 mounted on an end portion thereof. A dog 18, rotatably mounted on the pivot 20 and provided with a toothed edge portion 21, engageable with teeth 22 of the pinion 17, is mounted on the inside of the reel casing end 14 substantially as shown in Figs. 2 and 3. The dog 18 is actuated by an essentially triangular eccentric 25, mounted on the rotatable shaft 26, whereby rotative movement imparted to said eccentric 25, acting against the sides 29 and 30 of the pivoted dog 18, causes engagement and disengagement of the toothed portions 21 of said dog with the teeth 22 of the pinion 17.

It is to be understood that the eccentric 25 is fixedly mounted on the shaft 26 and accordingly rotative motion imparted to said shaft is reflected in rotation of said eccentric. The shaft 26, rotatably mounted in the reel casing end 14, carries on its free end a collar 35 attached thereto by fastening means 36. A channeled U-shaped frame 37, having a cut-away portion 38 in the back thereof, is substantially fixedly mounted on said collar and is rotatable in conjunction therewith. Openings 40 formed in the distal end portion of the frame 37, are adapted to receive and rotatably hold a threaded collar 43, having projecting lug-like formations 44 journalled in said openings. A pendulum 45, preferably threaded along the length thereof for purposes of adjustment, is engaged with the internally threaded collar 43 hereinbefore described, and normally depends from said collar substantially as shown in Figs. 1 and 2.

In use, the rod 11 is positioned over the shoulder preparatory to casting, whereby the pendulum 45 is rotated in a clockwise direction thereby rotating the shaft 26 and moving the toothed portion 21 of the dog 18 into engagement with the teeth 22 of the pinion 17, whereby rotative motion of the reel 12 is precluded. During casting, as the rod 11 is moved over the shoulder and forwardly, the pendulum 45 rotates in a counter-clockwise direction thereby rotating the shaft 26 and associated eccentric 25 and disengaging the toothed portion 21 of the dog 18 from engagement with the teeth 22 of the pinion gear 17. It is to be particularly noted that rotative motion of the shaft 26 does not ensue directly upon movement of the fishing rod; that is to say, the pendulum 45 rotates about the openings 40, using the lugs 44 as pivots, and abuts against the cross piece 49 of the U shaped frame 37, thereby causing rotative movement of said frame together with associated axle 26 and eccentric 25.

It will be noted that, when in use, the device serves to substantially automatically control the rotative movement of the reel whereby the reel is permitted free rotation only at the time optimum for proper casting.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. In a fishing line reel of the type described including supported, spaced, essentially parallel reel end plates, an axle, rotatably mounted in said end plates, carrying a line spool fixedly secured thereto and rotatable therewith; the improvement which comprises braking means for inhibiting rotation of said spool and a pendulum for controlling operation of said means.

2. In a fishing line reel of the type described including supported, spaced, essentially parallel reel end plates, an axle, rotatably mounted in said end plates, carrying a line spool fixedly secured thereto and rotatable therewith; the improvement which comprises a pinion gear fixedly mounted on an end of and rotatable with said axle; a pivotally mounted dog having a toothed edge portion engageable, upon occasion, with said pinion gear; means for moving said dog comprising a rotatably mounted shaft, an eccentric mounted on and rotatable with said shaft, engaging with slotted portions of said dog whereby rotation of said shaft engages and disengages said dog and said gear; and means, dependent upon position of said reel for rotating said shaft.

3. In a fishing line reel of the type described including supported, spaced, essentially parallel reel end plates, an axle, rotatably mounted in said end plates, carrying a line spool fixedly secured thereto and rotatable therewith; the improvement which comprises a pinion gear fixedly mounted on an end of and rotatable with said axle; a pivotally mounted dog having a toothed edge portion engageable, upon occasion, with said pinion gear; means for moving said dog comprising a rotatably mounted shaft, an eccentric mounted on and rotatable with said shaft, engaging with slotted portions of said dog whereby rotation of said shaft engages and disengages said dog and said gear; and means, dependent upon position of said reel for rotating said shaft, said means comprising a U-shaped frame mounted on said shaft extending substantially at a right angle relative to the axis thereof, an internally threaded collar pivotally mounted in the distal end of said frame, and a weighted pendulum mounted in said collar by engagement with threaded portions thereof.

4. In a fishing line reel including supported, spaced, essentially parallel reel and plates, an axle, rotatably mounted in said end plates, carrying a line spool fixedly secured thereto and rotatable therewith; the improvement which comprises a pinion gear fixedly mounted on an end of and rotatable with said axis; a pivotally mounted dog having a toothed edge portion engageable, upon occasion, with said pinion gear; and a pendulum, operatively connected to said dog, for moving said dog into or out of engagement with said pinion gear.

NATHAN POLIKOFF.
WILLIAM GUNNER.